US012790445B2

(12) United States Patent
Koyama et al.

(10) Patent No.: US 12,790,445 B2
(45) Date of Patent: Nov. 10, 2026

(54) LIGNIN COMPOSITION AND USE THEREOF

(71) Applicant: IDEMITSU KOSAN CO., LTD., Chiyoda-ku (JP)

(72) Inventors: Yoshihito Koyama, Sodegaura (JP); Toshifumi Miyagawa, Chiyoda-ku (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 694 days.

(21) Appl. No.: 18/252,445

(22) PCT Filed: Dec. 21, 2021

(86) PCT No.: PCT/JP2021/047204

§ 371 (c)(1),
(2) Date: May 10, 2023

(87) PCT Pub. No.: WO2022/145280

PCT Pub. Date: Jul. 7, 2022

(65) Prior Publication Data

US 2024/0010798 A1 Jan. 11, 2024

(30) Foreign Application Priority Data

Dec. 28, 2020 (JP) ................................ 2020-218406
Sep. 22, 2021 (JP) ................................ 2021-154350

(51) Int. Cl.
*C08H 6/00* (2010.01)
*C08H 7/00* (2011.01)
(Continued)

(52) U.S. Cl.
CPC ................ *C08H 6/00* (2013.01); *C08K 5/13* (2013.01); *C08K 5/17* (2013.01); *C08L 61/04* (2013.01);
(Continued)

(58) Field of Classification Search
None
See application file for complete search history.

(56) References Cited

U.S. PATENT DOCUMENTS 4,647,704 A * 3/1987 Engel ...................... C07C 37/52 568/761
4,739,040 A * 4/1988 Naae ...................... C09K 23/50 530/502
(Continued)

FOREIGN PATENT DOCUMENTS

CN 105793272 A 7/2016
CN 105873970 A 8/2016
(Continued)

OTHER PUBLICATIONS

Improving base catalyzed lignin depolymerization by avoiding lignin repolymerization, Toledano et al. Fuel 116 (2014) 617-624 (Year: 2014).*
(Continued)

*Primary Examiner* — Peter A Salamon
(74) *Attorney, Agent, or Firm* — Oblon, McClelland, Maier & Neustadt, L.L.P.

(57) ABSTRACT

A lignin composition containing two or more compounds represented by the following formula (1), where the total
(Continued)

content of the compounds is 0.06% by mass or more:

(1)

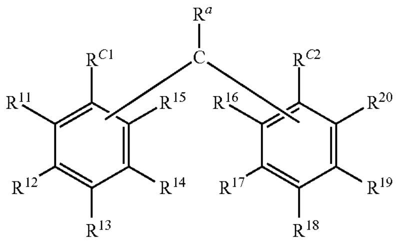

where in the formula, $R^a$ is a hydrogen atom, a methyl group, an ethyl group, a furyl group, a hydroxymethylfuryl group, a hydroxyphenyl group, a hydroxymethoxyphenol group, or a hydroxydimethoxyphenol group; $R^{c1}$ and $R^{c2}$ are independently a hydroxyl group, an alkoxy group, an amino group, or a thiol group; $R^{11}$ to $R^{20}$ are independently a hydrogen atom, a hydroxyl group, a hydrocarbon group including 1 to 15 carbon atoms, a hydrocarbon ether group including 1 to 15 carbon atoms, or a group containing a carbonyl group.

20 Claims, 2 Drawing Sheets

(51) Int. Cl.
*C08K 5/13* (2006.01)
*C08K 5/17* (2006.01)
*C08L 61/04* (2006.01)
*C08L 97/00* (2006.01)

(52) U.S. Cl.
CPC ......... *C08L 97/005* (2013.01); *C08L 2203/30* (2013.01)

(56) References Cited

U.S. PATENT DOCUMENTS 4,787,454 A * 11/1988 Naae ...................... C09K 23/50 166/275
5,010,156 A * 4/1991 Cook ..................... C08G 14/14 527/403
5,230,814 A * 7/1993 Naae ...................... C09K 8/584 530/502
2013/0253177 A1 9/2013 Kuroe
2016/0215143 A1* 7/2016 Gotou ................... C08L 97/005
2016/0257791 A1* 9/2016 Pietarinen .............. B27N 3/002
2020/0377672 A1* 12/2020 Tashiro .................... C08H 6/00

FOREIGN PATENT DOCUMENTS

CN 110914341 A 3/2020
JP 2008-156601 A 7/2008
JP 2009-84320 A 4/2009
JP 2013-199561 A 10/2013
JP 2016-539216 A 12/2016
JP 2018-165316 A 10/2018
JP 2020-50814 A 4/2020
JP 2020-50815 A 4/2020
TW 201529740 A 8/2015
WO WO 2015/046588 A1 4/2015
WO WO 2015/147165 A1 10/2015
WO WO 2019/031610 A1 2/2019

OTHER PUBLICATIONS

Extended European Search Report issued Oct. 8, 2019, in corresponding European Patent Application No. 21915140.4, 7 pages.
International Search Report issued on Mar. 15, 2022 in PCT/JP2021/047204, 2 pages.
International Preliminary Report on Patentability with Written Opinion issued on Jul. 13, 2023 in PCT/JP2021/047204, 7 pages.
Combined Chinese Office Action and Search Report issued May 6, 2025, in corresponding Chinese Patent Application No. 202180087787.8 (with English Translation of Category of Cited Documents), 11 pages.
Ana Toledano et al., "Improving base catalyzed lignin depolymerization by avoiding lignin repolymerization", Fuel 116 (2014) 617-624.
Combined Chinese Office Action and Search Report issued May 6, 2025, in corresponding Chinese Patent Application No. 202180087787.8 (with English Translation of Category of Cited Documents) citing documents 15-18 and 24 therein, 11 pages.
Li Gaiyun, Dissertation for the Degree, "Phenolation of wood decayed by brown-rotted fungi and resinification of phenolated wood product", 2007, 140 pages (with English Abstract).

* cited by examiner

LIGNIN COMPOSITION AND USE THEREOF

CROSS REFERENCE TO RELATED APPLICATIONS

This application is a National Stage entry under 35 U.S.C. § 371 of PCT/JP2021/047204, filed on Dec. 21, 2021, and claims priority to Japanese Patent Application No. 2020-218406, filed on Dec. 28, 2020, and Japanese Patent Application No. 2021-154350, filed on Sep. 22, 2021, the entire contents of which are incorporated herein by reference.

TECHNICAL FIELD

The present invention relates to a lignin composition and the use thereof.

BACKGROUND ART

Attempts have been made to improve mechanical properties such as bend strength of the resulting molded article by mixing or reacting lignin with a resin. However, it is known that when lignin is added to a thermosetting resin before molding, fluidity generally decreases.

In order to solve the above problems, a method has been proposed in which lignin is modified with phenol or the like to prevent a decrease in fluidity when a resin is added.

For example, Patent Document 1 discloses that a molding material obtained by adding lignin to a novolac-type phenol resin has poor resin flow and cannot be molded due to clogging, but a molding material obtained by adding a lignin-modified novolac-type phenol resin obtained by a production method in which lignin, phenol or a phenol derivative, and aldehydes are reacted with a novolac-type phenol resin in the presence of an organic acid has improved moldability. However, in Patent Document 1, the bending strength is somewhat reduced with respect to a normal novolac-type phenol resin, and there are problems that secondary treatment of lignin with volatile organic bases, etc. is likely to be required, as well as problems that use of highly toxic formaldehyde.

Patent Document 2 discloses that by reacting lignin, phenols, and aldehydes in the presence of an acid catalyst, the thermal fluidity at the time of molding a friction material is improved, and the friction characteristics are improved. However, in Patent Document 2, there are problems that a pretreatment of purification of lignin by methanol, ethanol, acetone, tetrahydrofuran, or the like is substantially necessary, as well as problems that use of highly toxic formaldehyde.

RELATED ART DOCUMENTS

Patent Documents

[Patent Document 1] JP 2008-156601 A
[Patent Document 2] JP 2013-199561 A

SUMMARY OF THE INVENTION

The thermosetting resin to which lignin is added and the fluidity is lowered is difficult to be uniformly filled in a mold or the like at the time of molding, and may cause a molding defect such as a short shot.

Therefore, an object of the present invention is to provide a lignin composition that can impart fluidity suitable for molding when added to a thermosetting resin or the like.

According to the present invention, the following lignin composition and the like are provided.

1. A lignin composition comprising two or more compounds represented by the following formula (1), wherein the total content of the compounds is 0.06% by mass or more:

(1)

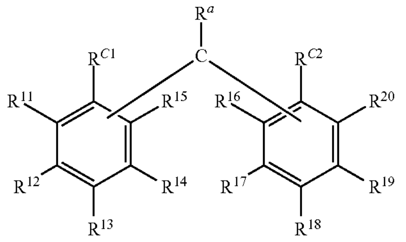

wherein in the formula, $R^a$ is a hydrogen atom, a methyl group, an ethyl group, a furyl group, a hydroxymethylfuryl group, a hydroxyphenyl group, hydroxymethoxyphenol group, or hydroxydimethoxyphenol group; $R^{c1}$ and $R^{c2}$ are independently a hydroxy group, an alkoxy group, an amino group, or a thiol group; $R^{11}$ to $R^{20}$ are independently a hydrogen atom, a hydroxy group, a hydrocarbon group including 1 to 15 carbon atoms, a hydrocarbon ether group including 1 to 15 carbon atoms, or a group containing a carbonyl group; each of $R^{11}$ to $R^{20}$ may be the same as or different from each other, provided that at least one of $R^{11}$ to $R^{15}$ is a hydrogen atom and at least one of $R^{13}$ to $R^{20}$ is a hydrogen atom.

2. The lignin composition according to 1, wherein the weight-average molecular weight (Mw) is 1000 to 3000.
3. The lignin composition according to 1 or 2, wherein the molecular weight distribution (Mw/Mn) is 2.2 to 3.5.
4. The lignin composition according to any one of 1 to 3, wherein the total content of the compounds represented by the formula (1) is 5% by mass or less.
5. The lignin composition according to any one of 1 to 4, wherein the content of the following compound (2) is 0.1% by mass or less.

(2)

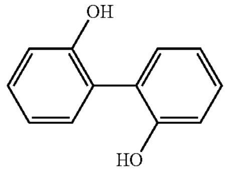

6. The lignin composition according to any one of 1 to 5, wherein the content of a free phenol monomer is 0.02% by mass or more and 5.0% by mass or less.
7. The lignin composition according to any one of 1 to 6, wherein the softening point is 100° C. or higher and lower than 250° C.
8. A lignin composition, wherein a maximum value of a peak of a differential distribution value (dw/d Log M) present in a molecular weight Log M2.4 to 2.6 of the lignin composition as measured by gel permeation chromatography (GPC) is 50 or more and 150 or less, or a difference of an integral distribution value (%) in a molecular weight Log M2.4 to 2.55 is 5 or more and 15 or less.

9. A thermosetting resin composition comprising the lignin composition according to any one of 1 to 8 and a thermosetting resin.

10. Use of the lignin composition according to any one of 1 to 8 for accelerating a crosslinking reaction in a thermosetting resin molding material containing a thermosetting resin.

11. The use of the lignin composition according to 10, wherein the thermosetting resin is one or more selected from phenol resin, urethane resin, epoxy resin, urea resin, melamine resin, unsaturated polyester resin, diallylphthalate resin, silicone resin, alkyd resin, and polyimide.

12. A method for accelerating a crosslinking reaction in a thermosetting resin molding material containing a thermosetting resin, the method using the lignin composition according to any one of 1 to 8.

13. A modifier fora thermosetting resin or a crosslinking reaction accelerator comprising the lignin composition according to any one of 1 to 8.

14. A rubber composition comprising the lignin composition according to any one of 1 to 8 and a rubber material.

15. A molded article obtained by curing the thermosetting resin composition of 9 or the rubber composition of 14.

16. A method for producing the lignin composition according to any one of 1 to 8, comprising an extraction step of extracting a lignin composition containing an extract derived from lignin from a lignin-containing material using a solvent containing an organic solvent.

By using the lignin composition of the present invention, a resin composition (molding material) having fluidity suitable for molding can be prepared. Further, a resin molded article having improved physical properties such as mechanical strength can be obtained.

MODE FOR CARRYING OUT THE INVENTION

Figure 1:
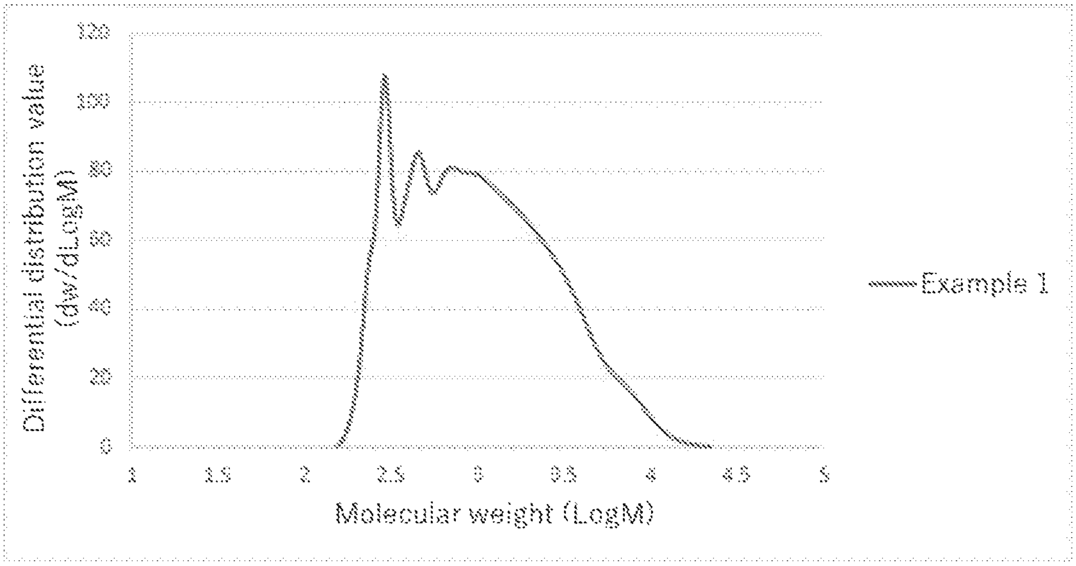
FIG. 1 is a chart showing the differential distribution value of molecular weight obtained by GPC for the sample of Example 1.

Hereinafter, in this specification, "x to y" represents a numerical range of "x or more and y or less." With regard to one technical matter, when a plurality of lower limit values such as "x or more" are present, or when a plurality of upper limit values such as "y or less" are present, the upper limit value and the lower limit value can be arbitrarily selected and combined.

Lignin Composition

The lignin composition according to one embodiment of the present invention contains two or more compounds represented by the following formula (1), and the total content of the compounds is 0.06% by mass or more.

(1)

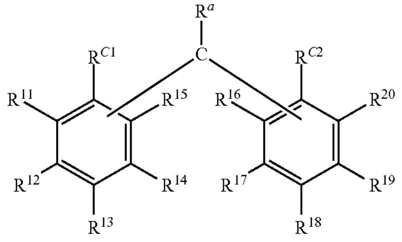

In the formula, $R^a$ is a hydrogen atom, a methyl group, an ethyl group, a furyl group, a hydroxymethylfuryl group, a hydroxyphenyl group, a hydroxymethoxyphenol group, or a hydroxydimethoxyphenol group; $R^{c1}$ and $R^{c2}$ are independently a hydroxyl group, an alkoxy group, an amino group, or a thiol group; $R^{11}$ to $R^{20}$ are independently a hydrogen atom, a hydroxyl group, a hydrocarbon group including 1 to 15 carbon atoms, a hydrocarbon ether group including 1 to 15 carbon atoms, or a group containing a carbonyl group; each of $R^{11}$ to $R^{20}$ may be the same as or different from each other, provided that at least one of $R^{11}$ to $R^{15}$ is a hydrogen atom, and at least one of R 16 to R 2° is a hydrogen atom.

The hydrocarbon group including 1 to 15 carbon atoms may be linear or branched, and the hydrocarbon group may be saturated or unsaturated. The hydrocarbon group including 1 to 15 carbon atoms is preferably a linear or branched hydrocarbon group including 1 to 10 carbon atoms, more preferably a linear or branched hydrocarbon group including 1 to 5 carbon atoms, and still more preferably a linear hydrocarbon group including 1 to 3 carbon atoms.

Any of these preferable hydrocarbon groups may be saturated or unsaturated.

The hydrocarbon ether group including 1 to 15 carbon atoms may be linear or branched, and the hydrocarbon may be saturated or unsaturated.

The hydrocarbon ether group including 1 to 15 carbon atoms is preferably a linear or branched hydrocarbon ether group including 1 to 10 carbon atoms, more preferably a linear or branched hydrocarbon ether group including 1 to 5 carbon atoms, and still more preferably a linear hydrocarbon ether group including 1 to 3 carbon atoms.

Any of the hydrocarbon of these preferable hydrocarbon ether groups may be saturated or unsaturated.

The hydrocarbon ether group can be represented by, for example, $—(CH_2)_a—O—(CH_2)_b—$, wherein a and b are both integers of 0 or more, provided that a+b is 1 or more. In this case, when the hydrocarbon ether group is linear, both of the structures represented by $—(CH_2)_a—$ and $—(CH_2)_b—$ are linear; and when the hydrocarbon ether group is branched, either of the structures represented by $—(CH_2)_a—$ or $—(CH_2)_b—$ is branched.

In addition, when the hydrocarbon of the hydrocarbon ether group is saturated, both of $—(CH_2)_a—$ and $—(CH_2)_b—$ are saturated hydrocarbons; and when the hydrocarbon of the hydrocarbon ether group is unsaturated, either of $—(CH_2)_a$ or $—(CH_2)_b—$ is an unsaturated hydrocarbon.

When the hydrocarbon ether group is represented by $—(CH_2)_a—O—(CH_2)_b—$, the number of carbon atoms of the hydrocarbon ether group is the number represented by (a+b).

Examples of the group containing a carbonyl group include an aldehyde group (—CHO), a carboxyl group (—COOH), a carbonyl group (—COR), an ester group (—COOR), and an amide group (—CONRR').

$R^{c1}$ to $R^{c2}$ may be any of a hydroxyl group, an alkoxy group, an amino group, and a thiol group, preferably a hydroxyl group or an alkoxy group, and more preferably a hydroxyl group.

The content of lignin contained in the lignin composition can be confirmed as a value calculated by measuring the content of the methoxyl group contained in the lignin composition in accordance with the method for measuring the methoxyl group by Viebock and Schwappach method (see "Lignin Chemical Study Method" P336 to 340, published by Uni Publication, 1994), and substituting the content of the obtained methoxyl group as the content of lignin.

When the lignin composition contains two or more of compounds represented by the formula (1) (hereinafter, sometimes referred to as phenol dimer) in a predetermined amount or more, fluidity when blended in the thermosetting resin can be maintained.

The type and content of the phenol dimer contained in the lignin composition are confirmed by liquid chromatography-mass spectrometry (LC/MS).

When the determination by liquid chromatography-mass spectrometry (LC/MS) is performed on the lignin composition, the content of the phenol dimer in the entire lignin composition can be calculated.

In addition, when the lignin composition is measured by liquid chromatography-mass spectrometry (LC/MS), the content of the phenol dimer in the entire thermosetting resin composition to be described later can be calculated according to the content ratio of the lignin composition and another component such as a phenol resin.

In LC/MS, it is assumed that compounds (a) to (h) below are contained in the lignin composition as the compound represented by the formula (1). If the detection limit or less, that is, if the content of the target compound is less than 0.001% by mass, the lignin composition is determined not to contain the target compound. The details of the measurement are described in Examples.

The content of each of the compounds (a) to (h) specified by the above-described LC/MS contains the content of isomers having the same molecular weight as the respective compounds and having different bonding positions.

(a)

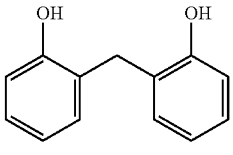

(b)

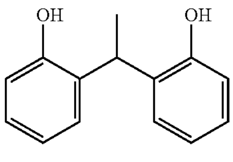

(c)

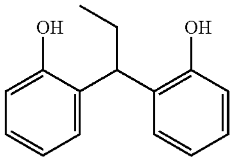

-continued (d)

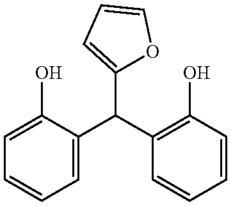

(e)

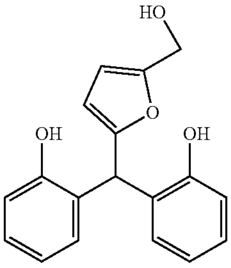

(f)

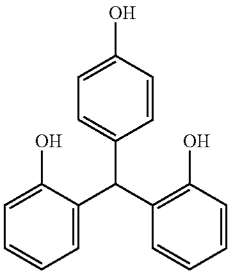

(g)

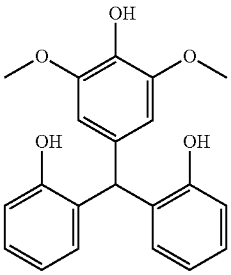

(h)

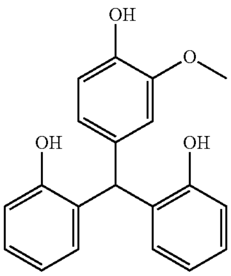

In this embodiment, for example, the lignin composition contains two or more compounds selected from the above compounds (a) to (h).

The total content of the compounds represented by the formula (1) with respect to the entire lignin composition is 0.06% by mass or more. As a result, the fluidity of the resin composition can be maintained when the resin composition is blended into the thermosetting resin. The total content may be 0.07% by mass or more, or 0.1% by mass or more. Further, the total content may be 5% by mass or less, may be 3% by mass or less, may be 2% by mass or less, and may be 1% by mass or less. The total content may be appropriately adjusted in accordance with the thermosetting resin to be used, molding conditions, and the like.

In one embodiment, the weight-average molecular weight (Mw) of the lignin composition is 1000 to 3000. As a result, the fluidity when blended into the thermosetting resin becomes easier to maintain. Further, a molded body having good mechanical properties becomes easier to obtain. Mw may be 1300 or more, and may be 1500 or more. Mw may be 2900 or less, and may be 2700 or less.

In one embodiment, the molecular weight distribution (Mw/Mn) of the lignin composition is 2.2 to 3.5. Mw/Mn may be 2.3 or more, may be 2.4 or more, may be 2.5 or more, and may be 2.6 or more. Mw/Mn may be 3.3 or less, 3.0 or less, and 2.7 or less.

The respective molecular weights of the lignin compositions are determined by GPC as described in Examples below.

In one embodiment, the content of the following compound (2) with respect to the entire lignin composition is 0.1% by mass or less, and may be 0.05% by mass or less.

(2)

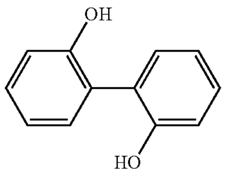

When the content of the compound (2) is in the above range, the loss of the solvent component due to the reaction between the solvent components is suppressed in the extraction step of lignin described later, and it can be said that the composition is obtained by appropriately participating in the lignin production of the solvent in the extraction step of lignin.

The content of the compound (2) is measured by the method described in Examples below. In one embodiment, the content of the free phenol monomer relative to the total lignin composition is 0.02% by mass to 5.0% by mass. The free phenol monomer contained in the lignin composition is mainly the residue of a part of the phenol used in the production of the lignin composition that has not been removed. The content of phenol may be 0.1% by mass or more, 0.5% by mass or more, 1.0% by mass or more, 2.0% by mass or more, or 3.0% by mass or more.

The content of phenol is determined by the method described in Examples below.

In one embodiment, the lignin composition has a softening point of 100° C. or higher and lower than 250° C. The softening point may be 110° C. or higher, may be 120° C. or higher, and may be 130° C. or higher. Further, the softening point may be 200° C. or lower, may be 180° C. or lower, and may be 160° C. or lower.

The softening point is measured by the method described in Examples below.

In the lignin composition according to another embodiment of the present invention, a maximum value of a peak of a differential distribution value (dw/d Log M) present in a molecular weight Log M2.4 to 2.6 of the lignin composition measured by GPC is 50 or more and 150 or less, or a difference of an integral distribution value (%) in a molecular weight Log M2.4 to 2.55 is 5 or more and 15 or less.

When the maximum value of the peak of the differential distribution value (dw/d Log M) present in the molecular weight Log M2.4 to 2.6 of the lignin composition measured by GPC is 50 or more and 150 or less, the fluidity when blended into the thermosetting resin can be maintained. The maximum value may be 130 or less, and may be 110 or less.

Similarly, when the difference between the integral distribution value (%) in the molecular weight Log M2.4 to 2.55 is 5 or more and 15 or less, the fluidity when blended into the thermosetting resin can be maintained. The integral distribution value may be 7 or more, and may be 8 or more. Further, the integral distribution value may be 13 or less, and may be 12 or less.

The lignin composition of the present invention is obtained, for example, by extracting from a lignin-containing material with a solvent containing an organic solvent and purifying the extract. The solvent containing an organic solvent typically contains at least a compound represented by the following formula (I).

(I)

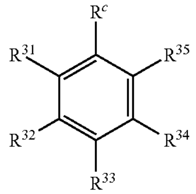

In the formula (I), $R^{31}$ to $R^{35}$ independently represents a hydrogen atom, a hydroxyl group, a hydrocarbon group including 1 to 15 carbon atoms, a hydrocarbon ether group including 1 to 15 carbon atoms, or a group containing a carbonyl group, and each of $R^{31}$ to $R^{35}$ may be the same as or different from each other. Provided that at least one of $R^{31}$ to $R^{35}$ is a hydrogen atom.

The hydrocarbon group in which $R^{31}$ to $R^{35}$ are hydrocarbon groups including 1 to 15 carbon atoms is the same as $R^{11}$ to $R^{20}$ in the formula (1). The hydrocarbon ether group in which $R^{31}$ to $R^{35}$ are hydrocarbon ether groups including 1 to 15 carbon atoms is the same as $R^{11}$ to $R^{20}$ in the formula (1). The group containing a carbonyl group in which $R^{31}$ to $R^{35}$ are groups containing a carbonyl group is the same as $R^{11}$ to $R^{20}$ in the formula (1).

$R^c$ represents a hydroxyl group, an alkoxy group, an amino group, or a thiol group.

$R^c$ may be any of a hydroxyl group, an alkoxy group, an amino group, and a thiol group, and from the viewpoint of affinity with the basic skeleton of lignin, a hydroxyl group or an alkoxy group is preferable, and a hydroxyl group is more preferable.

The solvent may contain a component other than the compound represented by the formula (I). Examples of the solvent component other than the compound represented by the formula (I) include at least one of alcohols, ketones, ethers, esters, aromatics other than the compound represented by the formula (I), and water, from the viewpoint of solubility of lignin in the raw material and economy.

In the specification, "lignin" is a polymer compound polymerized from three kinds of lignin monomers, which are p-hydroxycinnamic alcohols, and has a basic skeleton represented by the following formula (A).

(A)

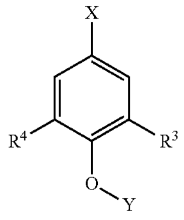

In the formula (A), the substituents $R^3$ and $R^4$ represent a hydrogen atom or a methoxy group. Those in which both $R^3$ and $R^4$ are hydrogen atoms are referred to as p-hydroxyphenyl nuclei (H-type skeleton), those in which either $R^3$ or $R^4$ is a hydrogen atom are referred to as guaiacyl nuclei (G-type skeleton), and those in which both $R^3$ and $R^4$ are not hydrogen atoms are referred to as syringil nuclei (S-type skeleton).

In the formula (A), X is bonded with a carbon atom, and Y is bonded with a hydrogen atom or a carbon atom.

(Lignin-Containing Material)

The lignin-containing material is not particularly limited as long as the material contains lignin.

In one embodiment, the lignin-containing material is one or more selected from the group consisting of biomass and biomass residues.

Examples of the biomass residues include, for example, those derived from plant-based biomass such as wood-based biomass and herbal-based biomass.

Examples of the biomass residues include a saccharification residue and a fermentation residue of a plant-based biomass (a second-generation ethanol saccharification residue, a second-generation ethanol fermentation residue, and the like), and a black liquor (sulfite lignin, kraft lignin, soda lignin, organosolv lignin, and the like), and any one or more of these examples may be used. Among these, from the viewpoints of availability, quality of the lignin composition, and economy, it is preferable to use any one or more of saccharification residues and fermentation residues of plant-based biomass as the lignin-containing material.

The wood-based biomass and herbal-based biomass, may be non-food plant biomass and may be lignocellulose-based biomass.

Examples of the wood-based biomass include conifers and hardwoods such as cedar, cypress, hiba, cherry, eucalyptus, beech, and bamboo.

Examples of the herbal-based biomass includes, for example, palm tree trunk and empty cavity of palm, palm fruit fiber and seed, bagasse (squeeze slag of cane and high biomass cane), cane top (top and leaf of cane), energetic cane, rice straw, wheat straw, corn cobs/stems/residues of corn (corn stover, corn cobs, corn hulls), residues of sorghum (including sweet sorghum), Jatropha peel and hulls, cashew hulls, switchgrass, erianthus, high biomass yield crops, energy crops, and the like.

Among these, herbal-based biomass is preferred, and empty cavity of palm, palm fruit fibers and seeds, wheat straw, corn cobs/stems/residues of corn (corn stover, corn cobs, corn hulls), bagasse, residues of sorghum (including sweet sorghum), cane top, energetic cane, and residues after extraction of useful components of these are more preferred, and empty cavity of palm, corn cobs/stems/residues of corn (corn stover, corn cobs, corn hulls), bagasse, residues of sorghum (including sweet sorghum), cane top, energetic cane, residues after extraction of useful components of these are more preferred. The useful components include, for example, hemicellulose, carbohydrates, minerals, moisture, and the like.

The bagasse contains about 5 to 30% by mass of lignin. In addition, lignin in the bagasse includes all of the H nuclei, the G nuclei, and the S nuclei as the basic skeleton.

The plant-based biomass may be pulverized. The plant-based biomass may also be in the form of a block, a chip, a powder, or a hydrate containing water.

An empty cavity of palm, a bagasse, a corn stover, or the like is treated with an organosolv method, a pressurized hydrothermal method, a steam explosion method, an ammonia treatment method, an ammonia explosion method, an acid treatment method, a dilute sulfate explosion method, an alkali treatment method, an oxidative decomposition method, a pyrolysis method, and microwave heating method, or the like, and preferably treated with an acid treatment, a dilute sulfate explosion, a steam explosion, or the like to separate hemicellulose to the solution side, and then the glucose is separated to the solution side by converting cellulose to glucose using an enzyme, or the hemicellulose is saccharified together with cellulose without separating the hemicellulose to separate to the solution side, and the remaining solid is a saccharification residue of the plant-based biomass. Alternatively, the saccharide is not separated, and is separated as ethanol by fermentation to the solution side, and the remaining solid is the fermentation residue of the plant-based biomass.

The saccharification residue of the plant-based biomass contains lignin as a main component, and contains decomposed organic substances, catalysts, enzymes, ash, cellulose, and the like. The fermentation residue of the plant-based biomass contains lignin as a main component, and contains decomposed organic substances, catalysts, enzymes, yeast, ash, cellulose, and the like.

The method for producing the lignin composition is, for example, as follows.

A solvent containing, for example, a compound having at least one selected from the group consisting of a hydroxyl group and an ether bond (hereinafter also referred to as "organic solvent A") is added using any one or more of the saccharification residue and the fermentation residue of the plant-based biomass as a raw material. The solvent comprising the organic solvent A typically contains at least a compound represented by the formula (I) as described above. The organic solvent A is described in detail in the "Solvent" section below.

After heating for about 2 to 4 hours, the heating solution contains insoluble matter, and is filtered through No. 2 filter paper. The Filtered solid is unextracted components and inorganic contaminants. The filtrate is distilled under reduced pressure to remove the solvent. The solvent that cannot be removed by distillation are removed by vacuum drying. The solid to be separated is lignin composition.

Further, as the lignin-containing material used as a raw material, a lignin separated from a non-food plant biomass by performing processes such as an organosolv method, a pressurized hydrothermal method, a steam explosion method, an ammonia treatment method, an ammonia explosion method, an acid treatment method, a dilute sulfate explosion method, an alkali treatment method, an oxidative decomposition method, a pyrolysis method and a microwave heating method can be used. Specifically, for example, a lignin contained in a non-food plant biomass can be eluted into a solvent by treating with an organic solvent or a solvent containing an organic solvent and water, and the lignin-containing solution can be filtered to remove cellulose and the like, and then the solution can be concentrated and dried to obtain a separated lignin. A lignin composition can be directly extracted from a non-food plant biomass by using a solvent containing the organic solvent A as the organic solvent.

(Solvent)

The solvent used for the extraction contains an organic solvent. The solvent containing an organic solvent typically contains a compound represented by the formula (I) as described above. Examples of the organic solvent other than the compound represented by the formula (I) include alcohols such as methanol, ethanol, isopropyl alcohol, ethylene glycol, and polyethylene glycol; ketones such as acetone and methyl ethyl ketone; ethers such as tetrahydrofuran and 1,4-dioxane; esters such as ethyl acetate; and aromatics other than the compound represented by the formula (I) such as toluene.

In one embodiment, a solvent containing the organic solvent A is used. By using the organic solvent A as the organic solvent for extracting lignin, it is expected that the extract derived from the lignin is suitably prevented from hydrophilic denaturation. The lignin composition to be extracted may be reacted with the organic solvent containing the organic solvent A. By using the organic solvent A, an extract derived from lignin can be suitably extracted.

When the organic solvent A has a hydroxyl group, the number of hydroxyl groups possessed by the organic solvent A is not particularly limited, and may be, for example, 1 or more, and may be 10 or less, 5 or less, 4 or less, 3 or less, or 2 or less. The number of hydroxyl groups possessed by the organic solvent A may be 1, 2, 3, 4 or 5, may be 1, 2 or 3, may be 1 or 2, and may be 1.

Examples of the organic solvent A having two hydroxyl groups include ethylene glycol, 1,2-propanediol, 1,3-propanediol, 1,2-butanediol, 1,3-butanediol, 1,4-butanediol, 2,3-butanediol, diethylene glycol, triethylene glycol, polyethylene glycol, and the like. Examples of the organic solvent A having three hydroxyl groups include glycerin, 1,2,3-butanetriol, 1,2,4-butanetriol, 1,2,3-heptatriol, 1,2,4-heptatriol, 1,2,5-heptatriol, 2,3,4-heptatriol, and the like. Examples of the organic solvent A having four hydroxyl groups include pentaerythritol, erythritol, and the like. Examples of the organic solventA having five hydroxyl groups include xylitol and the like. Examples of the organic solvent A having six hydroxyl groups include sorbitol and the like.

From the viewpoints of improving the extraction efficiency of lignin, and economy, the organic solvent A having two or more hydroxyl groups (organic solvent A having a plurality of hydroxyl groups) is preferably at least one selected from the group consisting of ethylene glycol, 1,2-propanediol, 1,3-propanediol, 1,2-butanediol, 1,3-butanediol, 1,4-butanediol, 2,3-butanediol, diethylene glycol, triethylene glycol, polyethylene glycol, polypropylene glycol, and glycerin, more preferably ethylene glycol, 1,2-propanediol, 1,3-propanediol, 1,2-butanediol, 1,3-butanediol, 1,4-butanediol, polyethylene glycol, polypropylene glycol, and glycerin, still more preferably one or more selected from the group consisting of ethylene glycol, polyethylene glycol, and glycerin, and still more preferably ethylene glycol and polyethylene glycol.

The organic solvent A is preferably a compound represented by the following formula (II).

$$R\text{—}OH \quad (II)$$

In the formula (II), R is an alkyl group including 1 to 10 carbon atoms, or a substituted or unsubstituted phenyl group.

When R is an arkyl group including 1 to 10 carbon atoms, the number of carbon atoms in the arkyl group may be 1 or more, 2 or more, 3 or more, or 4 or more, and may be 10 or less, 8 or less, and 6 or less. The alkyl group may be linear or branched.

In particular, when the number of carbon atoms in the alkyl group is 2 or more, it is expected that the extract derived from lignin is more remarkably prevented from hydrophilic denaturation. Further, as the number of carbon atoms increases to 2 or more, 3 or more, or even 4 or more, such an effect can be expected to be more remarkably exhibited.

The compound represented by the formula (II) in which R is an alkyl group including 1 to 10 carbon atoms is, for example, one or more selected from the group consisting of methanol, ethanol, 1-propyl alcohol, 2-propyl alcohol, 1-butyl alcohol, 2-butyl alcohol, isobutyl alcohol, tertiary-butyl alcohol, 1-pentyl alcohol, 2-pentyl alcohol, 3-methyl-1-butyl alcohol, 1-hexyl alcohol, cyclohexyl alcohol, 1-heptyl alcohol, 1-octyl alcohol, 2-ethylhexyl alcohol, and the like; preferably one or more selected from the group consisting of methanol, ethanol, 1-propyl alcohol, and 2-propyl alcohol, more preferably one or more selected from the group consisting of methanol, ethanol, and 2-propyl alcohol, and still more preferably ethanol.

The compound represented by the formula (I) described above corresponds to a case where R is a substituted or unsubstituted phenyl group in the formula (II), and the hydroxyl group ("OH" group in the formula (II)) is $R^c$ described above.

In the compound represented by the formula (I), at least one of $R^{31}$, $R^{33}$, and $R^{35}$ is preferably a hydrogen atom, and more preferably all of $R^{31}$, $R^{33}$, and $R^{35}$ are hydrogen atoms.

The compound represented by the formula (I) is, for example, one or more selected from the group consisting of phenol, catechol, resorcinol, hydroquinone, phloroglucin, o-cresol, m-cresol, p-cresol; 2-alkylphenols such as 2-ethylphenol and 2-propylphenol; 3-alkylphenols such as 3-ethylphenol, 3-propylphenol, and cardanol; 4-alkylphenols such as 4-ethylphenol, 4-propylphenol, 4-octylphenol, and 4-nonylphenol; and 5-alkylresorcinol such as 5-methylresorcinol, 5-ethylresorcinol, and 5-propylresorcinol; 3,5-dialkylphenols such as 3,5-dimethylphenol, 3-methyl-5-ethylphenol, and 3,5-diethylphenol; anisole, aniline, thiophenol, and the like;

preferably one or more selected from the group consisting of phenol, catechol, resorcinol, hydroquinone, o-cresol, m-cresol, p-cresol, cardanol, 4-octylphenol, 4-nonylphenol, and anisole; more preferably one or more selected from the group consisting of phenol, catechol, resorcinol, hydroquinone, o-cresol, m-cresol, p-cresol, and anisole; still more preferably one or more selected from the group consisting of phenol, o-cresol, m-cresol, p-cresol, and anisole; still more preferably one or more selected from the group consisting of phenol and anisole; and still more preferably phenol.

When a compound represented by the formula (I) such as phenol is used as the organic solvent, the lignin composition can be expected to increase the skeleton of the H-type skeleton and the G-type skeleton by reacting with the compound represented by the formula (I).

When the compound represented by the formula (I) is used as the organic solvent, it is expected that the reaction between the lignin and the compound represented by the formula (I) result in a substitution reaction in which the substituents R 3 and R 4 in the lignin basic skeleton represented by the formula (A) in the lignin are transferred to the structure derived from the compound represented by the formula (I).

The organic solvent A may be used alone or in combination of two or more thereof.

As the organic solvent A, for example, one or two or more selected from compounds represented by the formula (II) in which R is an alkyl group including 1 to 10 carbon atoms and one or two or more selected from compounds represented by the formula (II) in which R is a substituted or unsubstituted phenyl group (i.e., compounds represented by the formula (I)) may be used in combination. As a specific example, ethanol and phenol may be used in combination.

The organic solvent may contain an organic solvent other than the organic solvent A.

The organic solvent other than the organic solvent A is not particularly limited, and examples thereof include, for example, ketones such as acetone and methyl ethyl ketone, esters such as ethyl acetate, and aromatics other than the compound represented by the formula (I) such as toluene. The organic solvent other than the organic solvent A may be used alone or in combination of two or more thereof.

In one embodiment, 10% by mass or more, 20% by mass or more, 30% by mass or more, 40% by mass or more, 50% by mass or more, 60% by mass or more, 70% by mass or more, 80% by mass or more, 90% by mass or more, 95% by mass or more, 97% by mass or more, or 99% by mass or more of the organic solvent is the organic solvent A.

The solvent used for the extraction may contain water in addition to the organic solvent.

The proportion of water to organic solvent in the solvent used for extraction may be, for example, 10 parts by mass or more, 20 parts by mass or more, 30 parts by mass or more, 50 parts by mass or more, or 70 parts by mass or more, and may be 900 parts by mass or less, 700 parts by mass or less, 400 parts by mass or less, 300 parts by mass or less, or 100 parts by mass or less, based on 100 parts by mass of the organic solvent.

When the lignin composition is extracted with a solvent from the lignin-containing material, the solvent may or may not be phase separated. When the solvent is phase separated, the "solvent used for extraction" means the solvent that constitutes the phase containing the highest concentration of the lignin composition.

(Extraction)

Extraction in the present invention refers to extraction of a lignin composition containing an extract derived from lignin from a lignin-containing material which contains a component other than lignin.

In one embodiment, "extraction" refers to extraction of a lignin composition from a lignin-containing solid matter when the lignin-containing material is a lignin-containing solid matter, rather than the addition of an organic solvent to a solution (e.g., an aqueous solution containing a basic compound) in which all of the lignin is already dissolved. In such an embodiment, the lignin-containing material prior to extraction (the lignin-containing material prior to addition of the organic solvent) contains:

a lignin-containing solid matter and lignin already dissolved in a solvent or a lignin-containing solid matter and no lignin already dissolved in the solvent.

In the extraction, the amount of the solvent added to the lignin-containing material is not particularly limited.

The mass ratio of solvent to lignin [solvent/lignin] in the lignin-containing material may be, for example, 0.1 or more, and may be, for example, 15 or less, 10 or less, 5 or less, 4 or less, 3 or less, 2 or less, 1 or less, 0.7 or less, or 0.5 or less.

(Acid Catalyst)

The above-mentioned extraction can be carried out without catalyst or under catalyst. Examples of the catalyst include an acid catalyst. Examples of the acid catalyst include inorganic acids such as phosphoric acid, phosphoric acid ester, hydrochloric acid, sulfuric acid, and sulfuric acid ester, and organic acids such as acetic acid, formic acid, oxalic acid, and p-toluenesulfonic acid. The acid catalyst may be used alone or in combination of two or more thereof.

The amount of the acid catalyst may be, for example, larger than 0% by mass, 0.1% by mass or more, or 0.2% by mass or more, and may be 5.0% by mass or less, 3.0% by mass or less, or 2.6% by mass or less, where the total amount of lignin and the solvent is 100 parts by mass.

When the extraction is carried out without a catalyst, for example, the post-treatment (purification step) after the extraction step can be omitted.

The extraction temperature is not particularly limited as long as the lignin composition can be extracted from the lignin-containing material, and may be, for example, 100° C. or higher, 140° C. or higher, higher than 140° C., 150° C. or higher, or 180° C. or higher, and may be 350° C. or lower, 300° C. or lower, 270° C. or lower, 250° C. or lower, or 230° C. or lower. When the temperature is higher than 140° C., the solubility of lignin (lignin composition) can be increased to promote extraction, and when the temperature is 300° C. or lower, the progress of lignin recombination can be suitably prevented.

The extraction time may be set as appropriate, and may be, for example, 0.1 hour or longer, 0.5 hours or longer, 1 hour or longer, or 2 hours or longer, and may be 15 hours or shorter, 10 hours or shorter, or 8 hours or shorter.

The extraction pressure may be set as appropriate, for example, 0.1 MPa or higher, or 0.5 MPa or higher, or 1.0 MPa or higher, and 10 MPa or lower, 5 MPa or lower, 4 MPa or lower, or 3 MPa or lower.

(Purification)

The lignin composition is produced by the above-described extraction, and may be purified after the extraction if desired. An example of purification will be described below.

The lignin composition after extraction may be first subjected to a solid-liquid separation step as purification (purification step). The lignin composition after extraction is dissolved in a solvent, but unextracted components and inorganic contaminants are present in the liquid as a solid. These are preferably removed by filtration (hot filtration). For example, the extract is placed in a pressurized filter (hot filter) equipped with a filter paper such as No. 5C or No. 2, and is filtered under pressure at about 20 to 100° C., about 20 to 70° C., usually about 20 to 50° C., and under about 0.1 to 0.99 MPa, usually about 0.1 to 0.4 MPa. The filtered solid may optionally be diluted and/or washed with a solvent and filtered. In the filtration, the lignin composition is contained in the filtrate. Further, for example, the extraction product liquid may be diluted and/or washed with at least one of water, ketones such as acetone and methyl ethyl ketone, alcohols such as methanol, ethanol, and isopropyl alcohol, and general-purpose solvents having a low boiling point such as ethers such as tetrahydrofuran, and then subjected to solid-liquid separation. In the solid-liquid separation, the lignin composition is contained in a solution.

The method of performing the solid-liquid separation is not particularly limited, and examples thereof include filtration, filter pressing, centrifugation, dehydration, and the like.

The solid-liquid separation apparatus used for the solid-liquid separation is not particularly limited, and for example, a filtration apparatus using filter or the like, a vacuum filter, a centrifugal separator, a screw decanter, dehydrators such as a belt press dehydrator, a screw press dehydrator, and a filter press dehydrator, a vibrating sieve, or the like can be used. Examples of the centrifugal separator include a decanter type and a disk type. These solid-liquid separation apparatuses may be used alone, or two or more apparatuses may be used in combination.

By performing solid-liquid separation using the above-described solid-liquid separation apparatus, solid such as unextracted components and inorganic contaminants contained in the lignin composition can be efficiently and effectively removed. Therefore, without performing reprecipitation for a lignin composition obtained by performing distillation or decompression to dryness described later, a lignin composition in which the content of components other than lignin contained in the lignin-containing material is effectively reduced can be obtained.

Further, a solution containing the lignin composition obtained through the above extraction step and, if desired, a solid-liquid separation step may be subjected to distillation. The distillation may be performed by vacuum distillation at the temperature of about 40 to 200° C., usually about 50 to 150° C., and under reduced pressure of about 3 to 20 kPa, usually about 5 to 10 kPa to remove the solvent. In the distillation, the lignin composition is obtained as a solid or viscous solid. Further, for example, when other diluting solvents are used, the solvent used for extraction can be removed by distilling under reduced pressure to remove the general-purpose solvent having a low boiling point at an appropriate temperature considering the boiling point of the solvent, and then the solvent used for extraction can be removed in the same manner as above. In the distillation, the lignin composition is obtained as a solid or viscous solid.

After the extraction step or the solid-liquid separation step, the lignin composition obtained by performing either or both of the solid-liquid separation step and the distillation may be subjected to a drying step in which a solvent (for example, an organic solvent A) remaining in the lignin composition is removed to purify, if desired.

The drying step may be performed, for example, by heating to about 50 to 250° C., usually about 100 to 180° C., under a reduced pressure of about 0.1 to 10 kPa, usually about 1.0 to 5.0 kPa, and decompressing to dryness such as vacuum drying in a solid state or a molten state. Further, the drying step may be performed by subjecting the lignin composition in a heated flow state after distillation to decompression to dryness, such as vacuum drying as the same.

Further, the drying step is not limited to the above-described decompression to dryness, and may be performed, for example, by blowing air to the lignin composition under an inert atmosphere (for example, under a nitrogen atmosphere) under normal pressure to remove the solvent remaining in the lignin composition.

Examples of the drying apparatus used for drying include a thin-film type dryer such as a disk dryer and a drum dryer, a paddle dryer, an agitation dryer, an extruder for devolatilization, and a twin-screw continuous kneader. These drying apparatuses may be used alone, or two or more apparatuses may be used in combination.

By performing drying using the drying apparatus described above, the solvent remaining in the lignin composition can be efficiently and effectively removed. Therefore, without reprecipitation for a lignin composition obtained through the drying step, a lignin composition in which the residual amount of a solvent component such as an organic solvent used in the extraction step is effectively reduced can be obtained.

Reprecipitation is not preferred for the lignin composition obtained by distillation or decompression to dryness. Accordingly, a lignin composition containing the compound represented by the formula (1) in the above content range can be easily obtained.

In the purification step, the above-mentioned filtration, distillation, and decompression to dryness may be performed alone or in combination of two or more thereof.

The organic solvent remaining in the lignin composition is not particularly limited, and is usually less than 30% by mass, preferably less than 10% by mass, more preferably less than 5% by mass, and still more preferably less than 1% by mass, based on the total amount thereof.

According to the method for producing a lignin composition of the present invention, it is preferable that 50% by mass or more of the content of lignin contained in the saccharification residue of the plant-based biomass or the fermentation residue of the plant-based biomass is taken out as the lignin composition, more preferably 60% by mass or more is taken out as the lignin composition, still more preferably 70% by mass or more is taken out as the lignin composition, even more preferably 80% by mass or more is taken out as the lignin composition, and even more preferably 90% by mass or more is taken out as the lignin composition.

The lignin composition of the present invention can be used as a molding material for various resins or rubbers. For example, the lignin composition can be used as a modifier for a thermosetting resin, a crosslinking reaction promoter, and a rubber reinforcing material.

Thermosetting Resin Composition

The thermosetting resin composition (molding material) according to one embodiment of the present invention contains the above-described lignin composition of the present invention and a thermosetting resin. Incidentally, the use of the lignin composition in the process of producing the thermosetting resin is also included.

Examples of the thermosetting resin include phenol resin, urethane resin, epoxy resin, urea resin, melamine resin, unsaturated polyester resin, diallylphthalate resin, silicone resin, alkyd resin, and polyimide.

Among these, phenol resin, urethane resin, and epoxy resin, which can react with lignin compositions and can also be used as a diluent, are preferable, phenol resin and urethane resin are more preferable, and phenol resin is still more preferable. Among the phenol resin, novolac-based phenol resin and resol-based phenol resin are more preferable, and novolac-based phenol resin is still more preferable.

These thermosetting resins may be used alone or in combination of two or more thereof.

Examples of the epoxy resin include a glycidyl ether-based epoxy resins synthesized from a compound having two or more hydroxy groups in the molecule such as 2,2-bis(4'-hydroxyphenyl)propane (called bisphenol A), bis(2-hydroxyphenyl)methane (called bisphenol F), 4,4'-dihydroxydiphenylsulfone (called bisphenol S), 4,4'-dihydroxybiphenyl, resorcin, saligenin, trihydroxydiphenyldimethylmethane, tetraphenylolethane, halogen substituents and alkyl substituents thereof, butanediol, ethylene glycol, erythritol, novolac, glycerin, and polyoxyalkylene and epichlorohydrin, etc.; a glycidyl ester-based epoxy resins synthesized from the compound having two or more hydroxyl groups and a phthalic acid glycidyl ester, etc.; an epoxy resin having a glycidyl group such as glycidylamine-based epoxy resins synthesized from primary or secondary amines such as aniline, diaminodiphenylmethane, methaxylenediamine, and 1,3-bisaminomethylcyclohexane and epichlorohydrin, etc.; an epoxy resin that do not have a glycidyl group, such as epoxidized soybean oil, epoxidized polyolefin, vinylcyclohexene dioxide, dicyclopentadiene dioxide, etc.

Among these, cresol novolac type epoxy resin and phenol novolac type epoxy resin having a similar chemical structure and good compatibility with lignin are preferable.

The content of the lignin composition in the thermosetting resin composition may be determined according to the purpose, and is preferably 5 to 300 parts by mass, more preferably 10 to 100 parts by mass, and still more preferably 20 to 100 parts by mass based on 100 parts by mass of the thermosetting resin from the viewpoint of obtaining good physical properties and moldability.

(Filler)

In one embodiment, the thermosetting resin composition may further contain a filler. The filler may be an inorganic filler or an organic filler.

Examples of the inorganic filler include spherical or crushed fused silica, silica powder such as crystalline silica, alumina powder, glass powder, glass fiber, glass flake, mica, talc, calcium carbonate, alumina, hydrated alumina, boron nitride, aluminum nitride, silicon nitride, silicon carbide, titanium nitride, zinc oxide, tungsten carbide, magnesium oxide and the like.

Examples of the organic filler include carbon fiber, aramid fiber, paper powder, wood powder, cellulose fiber, cellulose powder, chaff powder, fruit shell/nut powder, chitin powder, starch and the like.

The inorganic filler and the organic filler may be used alone or in combination of two or more thereof, and the content thereof is determined depending on the purpose. When the inorganic filler and/or the organic filler is contained, it is desirable that the content of the inorganic filler and/or the organic filler is appropriate in order to obtain good physical properties and moldability. In this respect, the content of the inorganic filler and/or the organic filler is preferably 50 to 200 parts by mass, and more preferably 80 to 150 parts by mass, based on 100 parts by mass of the total of the thermosetting resin and the lignin composition.

(Curing Agent)

The thermosetting resin composition may further contain a curing agent.

When the thermosetting resin is phenol resin, examples of the curing agent include hexamethylenetetramine (hexamine), hexaformaldehyde, paraformaldehyde, and the like. These may be used alone or in combination of two or more thereof.

When the thermosetting resin is urethane resin, examples of polyisocyanate as the curing agent include aromatic polyisocyanates such as tolylene diisocyanate (TDI), 4,4'-diphenylmethane diisocyanate (MDI), polymeric MDI (MDI-CR), carbodiimide-modified MDI (liquid MDI); aliphatic polyisocyanates such as norbornane diisocyanate (NBDI), isophorone diisocyanate (IPDI), hexamethylene diisocyanate (HDI), 4,4'-methylene-bis(cyclohexyl isocyanate) (hydrogenated MDI), xylylene diisocyanate (XDI), and the like; blocked isocyanates, and the like. These may be used alone or in combination of two or more thereof.

When the thermosetting resin is epoxy resin, the lignin composition is used as a curing agent, and in this case, epoxy resin and novolac phenol resin may be used in combination.

In addition to the curing agent, in order to further enhance the curing rate and the degree of curing, inorganic bases such as calcium hydroxide, sodium hydroxide, potassium hydroxide, calcium oxide, and magnesium oxide; Lewis acids such as zinc chloride and zinc acetate; catalysts such as triethylamine; organometallic catalysts such as zirconium, aluminum, and the like; dibutyltin laurate, a phenol salt of DBU, an octylate salt, amines, imidazoles, ammonium salts, phosphines, phosphonium salts, and the like may be used. These may be used alone or in combination of two or more thereof.

(Other Additive)

Various additives can be added to the thermosetting resin composition according to this embodiment within a range that does not impair the characteristics of the molded article obtained from the thermosetting resin composition. Further, a compatibilizer, a surfactant, and the like may be further added depending on the purpose.

As the compatibilizer, resin obtained by adding maleic anhydride, epoxy, or the like to a thermoplastic resin to introduce a polar group, for example, maleic anhydride-modified polyethylene resin, maleic anhydride-modified polypropylene resin, or various commercially available compatibilizers may be used in combination.

Examples of the surfactant include, and are not limited to, linear fatty acids such as stearic acid, palmitic acid, and oleic acid, and branched/cyclic fatty acids with rosins.

In addition to the above-mentioned additives, examples of the additive that may be blended include a flexibilizer, a heat stabilizer, an ultraviolet absorber, a flame retardant, an antistatic agent, an antifoaming agent, a thixotropic agent, a mold release agent, an antioxidant, a plasticizer, a stress reducing agent, a coupling agent, a dye, a light scattering agent, a small amount of a thermoplastic resin, and the like. These may be used alone or in combination of two or more thereof.

(Kneading and Molding)

The blending and kneading of the components used in the thermosetting resin composition can be performed by a method using a commonly used apparatus, for example, premixing using a ribbon blender, a drum tumbler, and the like, and then blending using a Henschel mixer, a Banbury mixer, a single-screw extruder, a twin-screw extruder, a multi-screw extruder, a roll kneader, co-kneader, and the like. The heating temperature at the time of kneading is usually appropriately selected in the range of 100 to 300° C.

The method for molding the thermosetting resin composition is not particularly limited. Examples thereof include a press molding method, an injection molding method, a transfer molding method, a medium molding method, and a FRP molding method.

Examples of the molded body using the thermosetting resin composition include a heat insulating material (for a house, for a heat insulating apparatus such as a refrigerator, for a marine vessel, and for a vehicle), an electronic component, resin for flack sand, resin for coated sand, resin for impregnation, resin for lamination, a prepreg, a decorative plate, a bonding material, a friction material, a FRP molding resin, a binder, an adhesive, a paint, an ink, a sealing material, a sliding material, a carbon material, an automotive component, an automotive tire reinforcing material, an OA apparatus, a mechanical, an information communication apparatus, an industrial material, and the like.

Rubber Composition

The rubber composition according to one embodiment of the present invention contains the lignin composition of the present invention described above and a rubber material.

Examples of the rubber material include various natural rubbers, various synthetic rubbers, and the like. Specific examples thereof include natural rubber (NR), modified natural rubber, styrene butadiene rubber (SBR), butadiene rubber (BR), isoprene rubber (IR), butyl rubber (IIR), ethylene propylene diene rubber (EPDM), acrylonitrile butadiene rubber (NBR), and chloroprene rubber (CR). These may be used alone or as a mixture of two or more thereof.

The amount of the rubber material added is not particularly limited, and is preferably 100 to 10000 parts by mass based on 100 parts by mass of the lignin composition. As a result, it is possible to restrain the rubber composition from becoming too hard and becoming less elongated, while ensuring sufficient reinforcement effect of the rubber composition.

The rubber composition of this embodiment may contain a filler in addition to the above-described components. Examples of the filler include those commonly used in rubber compositions such as carbon black, silica, alumina, cellulose fiber, and the like.

The content of the filler is preferably 10 to 150 parts by mass based on 100 parts by mass of the rubber material.

In one embodiment, the rubber composition may contain a crosslinking agent. The crosslinking agent is not particularly limited as long as the agent can crosslink with either or both of the rubber material and the lignin composition.

Furthermore, the rubber composition may contain, for example, a softener, a tackifier, an antioxidant, an antiozonant, an antiaging agent, sulfur or other vulcanizing agents, a vulcanization accelerator, a vulcanization accelerator aid, peroxide, zinc oxide, and stearic acid.

The rubber composition may be produced, for example, by kneading the rubber material, the lignin composition and other raw materials. An arbitrary raw material may be pre-mixed and then kneaded, if desired. Further, the order in which the above-described raw materials are kneaded is not particularly limited, and all the raw materials may be kneaded at the same time, or may be kneaded sequentially in an arbitrary order.

The cured product (molded body) of the rubber composition can be obtained by molding and curing the rubber composition. The molding method varies depending on the application, and therefore is not particularly limited, and when molding is performed using a mold, the rubber composition is molded using a mold provided with a hydraulic press. As a result, a cured product of the rubber composition formed into the desired shape is obtained.

The molded body obtained by curing the rubber composition of this embodiment can be used for tires or the like.

EXAMPLE

Preparation of Lignin Composition

Example 1

(1) Extraction Step 100 parts by mass (68 parts by mass as lignin) of the saccharification residue (lignin content: 68% by mass) of the non-food plant biomass and 272 parts by mass of the phenol were placed in an agitatable pressure-resistant container, and heated and agitated at 0.8 MPa and 220° C. for 4 hours.

(2) Purification Step (2-1) Filtration

After diluting with acetone, the extract obtained in the above extracting step was placed in a pressure filter incorporating No. 2 filter paper, pressurized to 0.1 to 0.4 MPa with compressed air or nitrogen, and filtered.

(2-2) Distillation

The filtrate obtained in (2-1) above was distilled under reduced pressure (5 to 10 kPa) and heated (40 to 60° C.) using an evaporator to remove acetone. In addition, phenol was removed by distillation under reduced pressure using an evaporator under reduced pressure (100 to 140° C.).

(2-3) Decompression to Dryness

In order to remove the phenol remaining in the above (2-2), the product of distillation was dried in vacuo under reduced pressure (1.0 to 5.0 kPa) and heated at 120 to 150° C., and phenol was removed to obtain a lignin composition.

Example 2

A lignin composition was obtained in the same manner as in Example 1, except that 245 parts by mass of phenol and 27 parts by mass of water was used, the extraction pressure was 1.7 MPa, and the extraction time was 2 hours.

Example 3

A lignin composition was obtained in the same manner as in Example 1, except that 55 parts by mass of phenol, 27 parts by mass of water, and 190 parts by mass of ethanol was used, the extraction pressure was 2.8 MPa, and the extraction time was 2 hours.

Comparative Example 1

500 g of bagasse (dried pomace of sugar cane) was heat-treated in the presence of 2100 mL of 1-butanol and 3300 mL of water at 200° C. for 2 hours. Filtration (No. 2 filter paper) was performed to remove cellulose-containing solids. The aqueous layer was separated from the filtrate and the 1-butanol layer was extracted. The extracted 1-butanol layer was concentrated and subjected to dryness to obtain lignin.

Comparative Example 2

Kraft lignin (Lignin, alkali manufactured by Sigma-Aldrich Co. LLC, product No. 370959) was evaluated.

Analysis of Lignin Composition

The lignin compositions and the like of Examples 1 to 3 and Comparative Examples 1 and 2 were evaluated as follows.

(1) Average Molecular Weight

The number-average molecular weight Mn, weight-average molecular weight Mw, Z-average molecular weight Mz, and molecular weight distribution (Mw/Mn) were measured by gel permeation chromatography (GPC). Specifically, the sample was dissolved in tetrahydrofuran to prepare a measurement sample. 100 μL of the measurement sample was injected into a GPC system "HLC-8220GPC (manufactured by Tosoh Corporation)" or "HLC-8420GPC (manufactured by Tosoh Corporation)" in which two "TSKgelGMHXL (manufactured by Tosoh Corporation)" and one "G2000HXL (manufactured by Tosoh Corporation)" which are organic general-purpose columns filled with a styrene-based polymer filler were connected in series, and tetrahydrofuran as an eluent was developed at 1.0 mL/min and 40° C., and the retention time was measured using a differential refractive index (RI).

Each average molecular weight of the sample was calculated from a calibration curve showing the relationship between the retention time and the molecular weight of a separately prepared standard polystyrene.

As a standard polystyrene for preparing a calibration curve, the following was used.

Standard polystyrene for calibration curve: "TSKgel" (weight-average molecular weight: 590 (type A-500), 1010 (type A-1000), 2630 (type A-2500), 5970 (type A-5000), 10,200 (type F-1), 18,100 (type F-2), 37,900 (type F-4), 96,400 (type F-10), 190,000 (type F-20), 427,000 (type F-40), 706,000 (type F-80), 1,090,000 (type F-128), 4,480,000 (type F-450)) manufactured by Tosoh Corporation Since some insoluble components were generated in tetrahydrofuran in the Kraft lignin of Comparative Example 2, the soluble components were analyzed.

The following items (a) to (d) were calculated from the molecular weight charts of the samples determined by GPC.

(a) Peak-Maximum Molecular Weight Log M in the Molecular Weight Log M2.4 to 2.6

(Molecular Weight Log M2.4 to 2.6 Peak)

The value of the molecular weight Log M indicating the peak maximum value of the differential distribution value (dw/d Log M) in the molecular weight Log M2.4 to 2.6 of the chart of the molecular weight of the sample obtained by GPC (y-axis plots dw/d Log M and x-axis plots Log M) was defined as the "molecular weight Log M2.4 to 2.6 peak."

(b) Maximum Differential Distribution Value (dw/d Log M)

In the chart of the molecular weight of the sample obtained by GPC (y-axis plots dw/d Log M and x-axis plots Log M), the maximum value of the peak of the differential distribution value (dw/d Log M) present in the molecular weight Log M2.4 to 2.6 was defined as the "maximum differential distribution value (dw/d Log M)".

FIG. 1 shows the chart of the differential distribution value of the molecular weight obtained by GPC for the sample of Example 1 (y-axis plots dw/d Log M and x-axis plots Log M).

In FIG. 1, in the molecular weight Log M2.4 to 2.6, the peak of the differential distribution value (dw/d Log M) appears in Log M=2.5, and the differential distribution value (dw/d Log M) thereof is defined as the "maximum differential distribution value (dw/d Log M)."

(c) Molecular Weight Log M2.4 Integral Distribution Value (%), Molecular Weight Log M2.55 Integral Distribution Value (%)

In the chart of the molecular weight of the sample obtained by GPC (y-axis plots integral distribution value (%), x-axis plots Log M), the integral distribution value (%) in the molecular weight Log M2.4 and the integral distribution value (%) in the molecular weight Log M2.55 are defined as the "molecular weight Log M2.4 integral distribution value" and "molecular weight Log M2.55 integral distribution value (%)," respectively.

(d) Integral Distribution Value (%) 2.55-2.4

The value of the difference obtained by subtracting the integral distribution value (%) of the molecular weight Log M2.4 from the integrated distribution value (%) of the molecular weight Log M2.55 was defined as "integral distribution value (%) 2.55-2.4."

Figure 2:
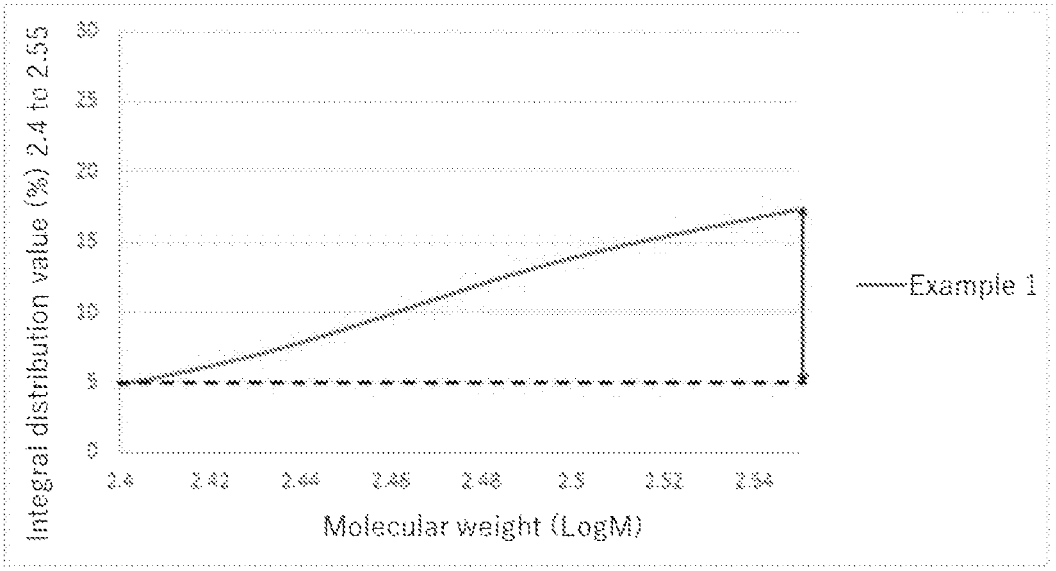
FIG. 2 is a chart showing the integrated distribution value of molecular weight obtained by GPC for the sample of Example 1.

FIG. 2 shows the chart of the integrated distribution value of the molecular weight obtained by GPC for the sample of Example 1 (y-axis plots integral distribution value (%), and x-axis plots Log M).

In FIG. 2, the integral distribution value in the molecular weight Log M2.4 was 4.8(%), the integral distribution value in the molecular weight Log M2.55 was 16.8(%), and the difference thereof (molecular weight Log M2.55 integral distribution value (%)-molecular weight Log M2.4 integral distribution value (%)) was defined as "integral distribution value (%) 2.55-2.4."

(2) Phenol Content

The phenol content was determined using high performance liquid chromatography (HPLC). Specifically, 50 mg of sample such as the lignin composition was dissolved in 0.5 mL of tetrahydrofuran, 4.5 mL of a mixed solvent of 4/1 (volume ratio) of water/acetonitrile was added thereto, the mixture was stirred for 30 minutes, and the supernatant was filtered to prepare a measurement sample. 1 μL of the measurement sample was injected into "ACQUITY UPLC H-CLASS" to which a BEH C18 (1.7 μm×2.1 mm×50 mm) column was connected. The column temperature was set at 40° C., the mobile phase was a mixed solvent of 2 mM ammonium acetate aqueous solution (A) and acetonitrile (B), and the flow rate ratio (A:B) was gradually changed from 80:20 to 10:90 using a gradient method, and the measurement was performed using an ultraviolet-visible spectrum (UV) detector 280 nm as a detector. The phenol content in the sample was calculated from the calibration curve of a separately prepared standard phenol solution.

(3) Phenol Dimer (Compounds Represented by the Formulas (1) and (2))

The content of the phenol dimer was determined using liquid chromatography/mass spectrometry (LC/MS). Specifically, 50 mg of sample such as the lignin composition was dissolved in 0.5 mL of tetrahydrofuran, 4.5 mL of a mixed solvent of 4/1 (volume ratio) of water/acetonitrile was added thereto, the mixture was stirred for 30 minutes, and the supernatant was filtered to prepare a measurement sample. 1 μL of the measurement sample was injected into LC-MS system in which a BEH C18 (1.7 μm×2.1 mm×50 mm) column was connected to "ACQUITY UPLC H-CLASS" and "Xevo G2-XS QTof" is equipped in the detector. The column temperature was set at 40° C., the mobile phase was a mixed solvent of 2 mM ammonium acetate aqueous solution (A) and acetonitrile (B), and the flow rate ratio (A:B) was gradually changed from 80:20 to 10:90 using a gradient method to separate the dimer component.

The resulting dimer component was ionized by electrospray and then measured using a negative mode quadrupole-time-of-flight mass spectrometer to measure the mass-to-charge ratio ranging from 50 to 1000.

Assuming that all of the compounds were detected in the deprotonated form, the structure of the dimer contained in the sample was determined to be the following compounds (a) to (h) and compounds (2) from the mass-to-charge ratio. The chromatogram was extracted with a mass-to-charge ratio corresponding to the structure of each compound, and the peak area was calculated.

The content of the phenol dimer component in the sample was calculated from a calibration curve of a separately prepared standard 2,2'-dihydroxydiphenylmethane solution.

(a)

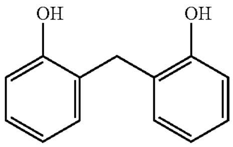

(b)

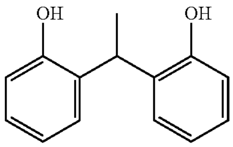

(c)

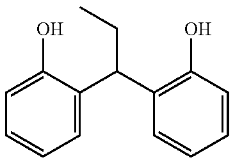

(d)

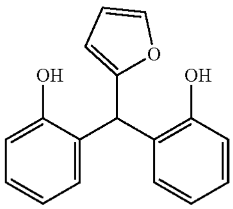

(e)

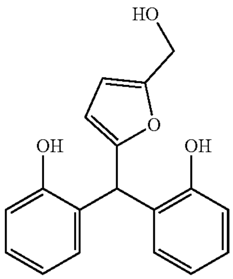

(f)

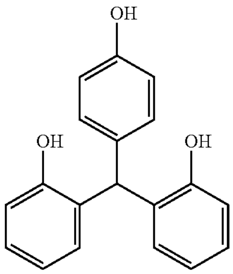

(g)

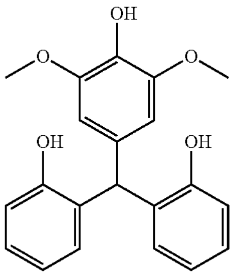

-continued (h)

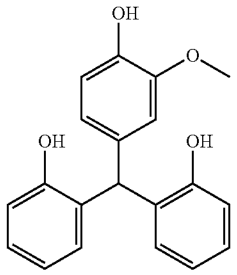

(2)

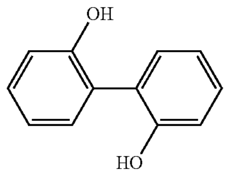

(4) Softening Point

The sample of the lignin composition and the like was ground in a mortar, and 10 to 20 mg of the ground sample was placed in an aluminum cup (round shape, top: φ60, bottom: φ53, depth: 15 mm). The aluminum cup with the sample was placed on a hot plate (IKAC-MAG HP7) and covered with aluminum foil. After heating to 100° C., the temperature was increased in steps of 10° C., the sample was visually observed, and the temperature at which the dissolution was visually observed was adopted as the softening point.

(5) Differential Scanning Calorimetry (DSC) Measurement

In the vial, 100 parts by weight of lignin or phenol resin and 15 parts by weight of hexamethylenetetramine (special reagent grade) were blended, and 500 parts by weight of methanol and acetone were added, respectively, and the vial was shaken for 5 minutes. The vial was then warmed at 40° C. and 100 parts by weight of methanol was added and the vial was shaken to completely dissolve the solid content. The resulting solution was air-dried overnight and the solvent was completely removed in a vacuum dryer at 40° C. The resulting lignin/hexamethylenetetramine mixture was ground in a mortar to obtain a measurement sample.

Differential scanning calorimetry (DSC) was performed using GCA-0017 manufactured by Hitachi High-Tech Science Corporation. 10 mg of the measurement sample prepared by the above-described method was enclosed in a sealed container (15 NL) made of Al and measured at a measurement temperature ranging from 30 to 240° C. and under a measurement atmosphere of nitrogen (100 mL/min). $Al_2O_3$ (10 mg) was used as a reference. From the obtained results, the temperature of the exothermic peak and calorific value during curing were calculated.

For reference, the peak temperature in DSC of phenol resin (manufactured by Sumitomo Bakelite Company Limited, product name: PR-53195) was 143° C. and the peak area was 117 J/g.

Evaluation results are shown in Table 1.

TABLE 1

| | Example 1 | Example 2 | Example 3 | Comp. Ex. 1 | Comp. Ex. 2 |
|---|---|---|---|---|---|
| Mn | 669 | 750 | 904 | 1041 | 1077 |
| Mw | 1638 | 2120 | 2668 | 2917 | 2279 |
| Mz | 3924 | 5385 | 6499 | 6767 | 4301 |
| Mw/Mn | 2.45 | 2.83 | 2.95 | 2.80 | 2.12 |
| Molecular weight LogM2.4 to 2.6 peak | 2.5 | 2.5 | 2.6 | 2.5 | 2.5 |
| Maximum differential distribution value (dw/dLogM) | 108.2 | 108.2 | 51.9 | 48.6 | 48.5 |
| Molecular weight LogM2.4 integral distribution value (%) | 4.8 | 3.6 | 3.4 | 1.6 | 0.6 |
| Molecular weight LogM2.55 integral distribution value (%) | 16.8 | 15.5 | 12.7 | 6.1 | 5.1 |
| Integral distribution value (%) 2.55-2.4 | 12.0 | 12.0 | 9.3 | 4.5 | 4.4 |
| DSC: Peak temperature (° C.) | 159 | 155 | 169 | 171 | 169 |
| DSC: Peak area (J/g) | 103 | 98 | 84 | 78 | 76 |
| Softening point (° C.) | 140-150 | 120-130 | 170-180 | 140-150 | >300 |
| | Content (% by mass) | | | | |
| Compound (a) | 0.297 | 0.210 | 0.005 | <0.001 | <0.001 |
| Compound (b) | 0.459 | 0.484 | 0.096 | <0.001 | <0.001 |
| Compound (c) | 0.052 | 0.024 | 0.000 | <0.001 | <0.001 |
| Compound (d) | 0.032 | 0.016 | 0.005 | 0.008 | 0.001 |
| Compound (e) | 0.020 | 0.005 | 0.007 | 0.006 | 0.003 |
| Compound (f) | 0.203 | 0.079 | 0.003 | 0.005 | 0.000 |
| Compound (g) | 0.065 | 0.024 | 0.003 | 0.002 | 0.046 |
| Compound (h) | 0.076 | 0.027 | 0.002 | 0.003 | 0.008 |
| Total of Compound (a) to (h) | 1.204 | 0.869 | 0.122 | 0.024 | 0.059 |
| Compound (2) | 0.014 | 0.002 | <0.001 | <0.001 | <0.001 |
| Free phenol monomer | 1.1 | 4.3 | 1.3 | 0.03 | 0.03 |

Figure 3:
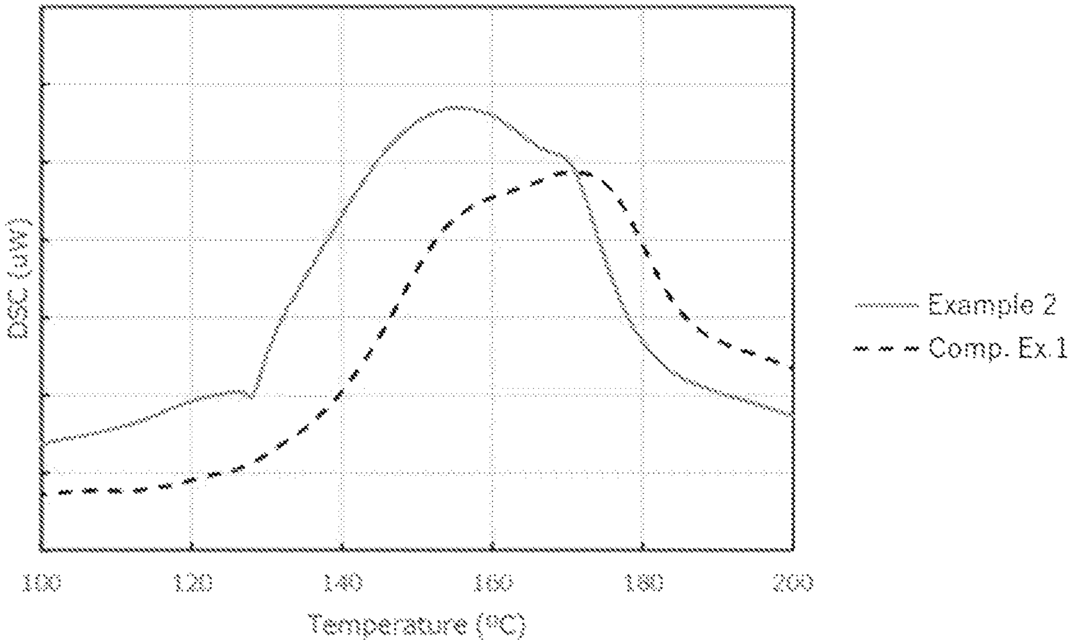
FIG. 3 is DSC curves of the lignin composition of Example 2 and the lignin of Comparative Example 1.

DSC curves of the lignin composition of Example 2 and the lignin of Comparative Example 1 are shown in FIG. 3. From FIG. 3, it can be confirmed that the peak temperature of the lignin composition of Example 2 is shifted to the low-temperature side as compared with that of the lignin of Comparative Example 1. This is expected to increase the uniformity of the molded body of the resin composition containing the lignin composition and the phenol resin because the lignin composition of Example 2 starts the curing reaction at a lower temperature and exhibits a reactivity more similar to that of the phenol resin.

In addition, the lignin composition of Example 2 has a wide peak area (i.e., has a larger heat of reaction) than the lignin of Comparative Example 1. This indicates that the lignin composition of Example 2 has high reactivity. Thus, when the lignin composition of Example 2 is used as the thermosetting resin molding material, the crosslinking reaction is expected to be accelerated.

Resin Composition and Molded Body

Example 4

(1) Preparation of Resin Composition

To a separable flask equipped with a stirrer, phenol resin (manufactured by Sumitomo Bakelite Company Limited, product name: PR-53195, softening point: 115° C.) and the lignin composition produced in Example 1 were charged with a mass ratio (phenol resin:lignin composition) of 7:3. The mixture was heated to 130° C. and stirred and mixed in the molten state for 30 minutes. The treated product was removed from the flask in the molten state to obtain a mixture of the lignin composition and phenol resin.

To 50 parts by mass of the obtained mixture, 7 parts by mass of hexamethylenetetramine (curing agent: manufactured by Kanto Chemical Co., Inc.) was added at room temperature, and the mixture was mixed for 5 minutes using a mortar machine.

Thereafter, 50 parts by mass of glass fibers (glass milled fibers, manufactured by NITTO BOSEKI CO., LTD., PF80E-401) as a filler, 1 part by mass of magnesium stearate (lubricant: manufactured by ADEKA CORPORATION) as an additive, and 1 part by mass of magnesium oxide (promoter: manufactured by KYOWA CHEMICAL Corporation) were blended, and mixed for about 5 minutes using a mortar machine.

The resulting mixture was kneaded in a heating roll at 120° C. for 7 minutes, and was ground after cooling to obtain a resin composition (molding material). The composition of the resin composition is shown in Table 2.

(2) Fluidity Evaluation of resin Composition (Spiral Flow)

The obtained resin composition was compressed by 15 tf at room temperature to produce a tablet. After preheating at 90° C. for 10 minutes in a hot air circulation oven, the tablet was charged into a transfer molding machine (MF-015: manufactured by MARUSHICHI ENGINEERING CO., LTD.).

Using a mold for spiral flow, the molding was performed at 165° C. and 40 MPa for 5 minutes, and the length of which the resin composition flowed was measured. Evaluation results are shown in Table 2.

(3) Molding of Resin Composition

The resin composition prepared in the above (1) was compressed by 15 tf at room temperature to produce a tablet. After preheating at 90° C. for 10 minutes in a hot air circulation oven, the tablet was charged into a transfer molding machine (MF-015: manufactured by MARUSHICHI ENGINEERING CO., LTD.).

Using a mold for test piece (10 mm×80 mm×thickness: 4 mm), the tablet was transfer-molded at 165° C. and 40 MPa for 3 minutes. Thereafter, heat treatment was performed at 180° C. for 8 hours to obtain a molded body (a cured product of the phenol-modified lignin resin composition).

(4) Evaluation of Physical Properties of Molded Body

For the molded body (test piece) obtained in the above (3), the flexural modulus, flexural strength, and flexural strain were measured in accordance with JIS K 7171 "Plastics-Determination of flexural properties." Specifically, a universal material tester (Type 5966, manufactured by Instron Corporation) was subjected to a three-point flexural test by applying a load at a speed of 2 mm/min and a distance of 64 mm between the fulcrums.

The moldability was evaluated according to the following criteria.

A: Good

B: Acceptable quality with a little overflow from the mold

C: Partial short has occurred

D: Fill short has occurred

E: Unacceptable quality with an overflow from the mold

Further, voids inside the molded body were visually evaluated by X-ray CT. The case when uniform voids are present inside the molded body is defined as "Y," and the case when voids are not present or voids are present in only a part of the molded body is defined as "X."

Evaluation results are shown in Table 2.

TABLE 2

| | | Example 4 | Example 5 | Example 6 | Comp. Ex. 3 | Comp. Ex. 4 |
|---|---|---|---|---|---|---|
| Composition (parts by mass) | Phenol resin | 35 | 35 | 35 | 35 | 35 |
| | Lignin composition (Example 1) | 15 | | | | |
| | Lignin composition (Example 2) | | 15 | | | |
| | Lignin composition (Example 3) | | | 15 | | |
| | Lignin (Comp. Ex. 1) | | | | 15 | |
| | Lignin (Comp. Ex. 2) | | | | | 15 |
| | Glass fibers | 50 | 50 | 50 | 50 | 50 |
| | Curing agent | 7 | 7 | 7 | 7 | 7 |
| | Promoter | 1 | 1 | 1 | 1 | 1 |
| | Lubricant | 1 | 1 | 1 | 1 | 1 |
| Evaluation | Spiral flow (cm) | 90 | 54 | 56 | 22 | 7 |
| | Flexural strength (MPa) | 139.5 | 133.2 | 154.2 | 148.0 | — |
| | Flexural modulus (GPa) | 13.3 | 12.3 | 13.2 | 13.0 | — |
| | Flexural strain (%) | 1.06 | 1.11 | 1.20 | 1.16 | — |
| | Moldability | B | A | A | C | D |
| | Number of voids | X | X | X | X | — |

Examples 5 and 6 and Comparative Examples 3 and 4

In the preparation of the resin composition, a resin composition and a molded body were prepared and evaluated in the same manner as in Example 4, except that the lignin composition or lignin of Examples 2 and 3 and Comparative Examples 1 and 2 were used instead of the lignin composition prepared in Example 1.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A lignin composition, comprising:

a first compound of formula (1); and a second compound of formula (1), different from the first compound:

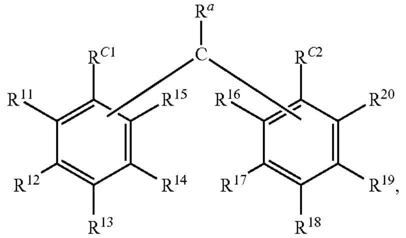

(1)

wherein $R^a$ is a hydrogen atom, a methyl group, an ethyl group, a furyl group, a hydroxymethylfuryl group, a hydroxyphenyl group, hydroxymethoxyphenol group, or hydroxy dimethoxyphenol group, $R^{c1}$ and $R^{c2}$ are independently a hydroxy group, an alkoxy group, an amino group, or a thiol group, $R^{11}$ to $R^{20}$ are independently a hydrogen atom, a hydroxy group, a group comprising a hydrocarbon group comprising 1 to 15 carbon atoms, a hydrocarbon ether group comprising 1 to 15 carbon atoms, or a group comprising a carbonyl group, each of $R^{11}$ to $R^{20}$ optionally being identical to or different from each other, provided that at least one of $R^{11}$ to $R^{15}$ is a hydrogen atom and at least one of $R^{16}$ to $R^{20}$ is a hydrogen atom, one of $R^{11}$ to $R^{15}$ is a single bond bonded to a central carbon atom C, and one of $R^{16}$ to $R^{20}$ is a single bond bonded to the central carbon atom C, wherein a weight-average molecular weight (Mw) of the lignin composition is in a range of from 1000 to 3000, and wherein a total content of compounds of formula (1) is 0.06% by mass or more, based on a total mass of the lignin composition.

2. The lignin composition of claim 1, wherein a weight-average molecular weight (Mw) of the lignin composition is in a range of from 1300 to 3000.

3. The lignin composition of claim 1, wherein a molecular weight distribution (Mw/Mn) of the lignin composition is in a range of from 2.2 to 3.5.

4. The lignin composition of claim 1, wherein a total content of compounds of formula (1) is 5% by mass or less, based on the total mass of the lignin composition.

5. The lignin composition of claim 1, further comprising:

a diol compound of formula (2) in 0.1% by mass or less:

(2)

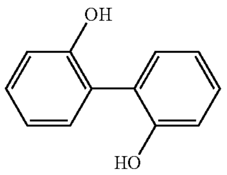

.

6. The lignin composition of claim 1, wherein a content of a free phenol monomer is in a range of from 0.02 to 5.0% by mass, based on the total mass of the lignin composition.

7. The lignin composition of claim 1, having a softening point in a range of from 100 to lower than 250° C.

8. The lignin composition of claim 1, having a maximum value of a peak of a differential distribution value (dw/d Log M) present in a molecular weight Log M2.4 to 2.6, measured by gel permeation chromatography, in a range of from 50 to 150, or having a difference of an integral distribution value (%) in a molecular weight Log M2.4 to 2.55 in a range of from 5 to 15.

9. A thermosetting resin composition, comprising:

the lignin composition of claim 1; and a thermosetting resin.

10. The lignin composition of claim 1, which is suitable for accelerating a crosslinking reaction in a thermosetting resin molding material comprising a thermosetting resin.

11. The lignin composition of claim 10, wherein the thermosetting resin comprises a phenol resin, urethane resin, epoxy resin, urea resin, melamine resin, unsaturated polyester resin, diallylphthalate resin, silicone resin, alkyd resin, and/or polyimide.

12. A method for accelerating a crosslinking reaction, the method comprising:

contacting a thermosetting resin and the lignin composition of claim 1 in a thermosetting resin molding material.

13. A modifier for a thermosetting resin or a crosslinking reaction accelerator, comprising:

the lignin composition of claim 1.

14. A rubber composition, comprising:

the lignin composition of claim 1; and a rubber material.

15. A molded article, obtained by curing the thermosetting resin composition of claim 9.

16. A method for producing the lignin composition of claim 1, the method comprising:

extracting a lignin composition comprising an extract derived from lignin from a lignin comprising material with a solvent comprising an organic solvent.

17. A molded article, obtained by curing the rubber composition of claim 14.

18. The lignin composition of claim 1, wherein, in the first compound and second compound, $R^{c1}$ and $R^{c2}$ are each a hydroxy group.

19. The lignin composition of claim 1, wherein the first compound is (a)

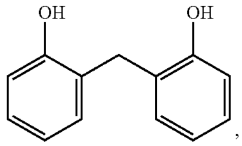

, and wherein the second compound is (b)

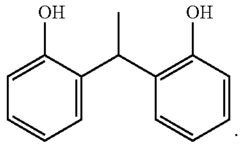

.

20. The lignin composition of claim 1, comprising, in a range of from 0.06 to 5% by mass in total, of (a)

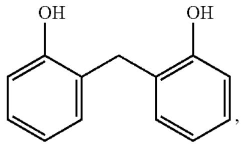

, (b)

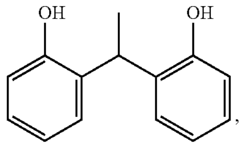

, (c)

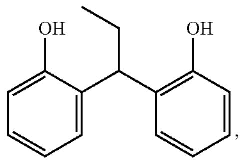

, (d)

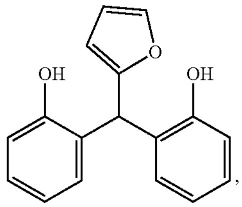

,

-continued
(e)
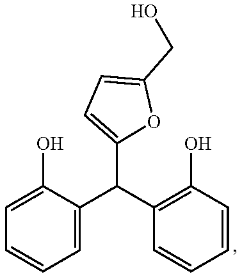
(f)
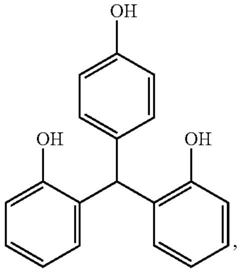
-continued
(g)
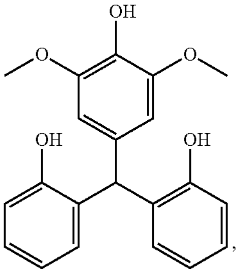
, and
(h)
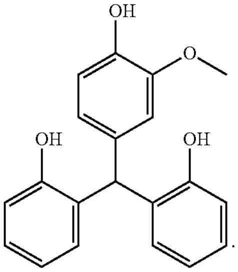
.
* * * * *